(12) United States Patent
Nemeyer

(10) Patent No.: US 8,833,994 B2
(45) Date of Patent: Sep. 16, 2014

(54) LIGHT POINTER HAVING OPTICAL FIBER LIGHT SOURCE

(71) Applicant: Laser Devices, Inc., Monterey, CA (US)

(72) Inventor: Adam Nemeyer, Cupertino, CA (US)

(73) Assignee: Laser Devices, Inc., Monterey, CA (US)

( * ) Notice: Subject to any disclaimer, the term of this patent is extended or adjusted under 35 U.S.C. 154(b) by 0 days.

(21) Appl. No.: 13/784,453

(22) Filed: Mar. 4, 2013

(65) Prior Publication Data

US 2013/0235609 A1 Sep. 12, 2013

Related U.S. Application Data

(60) Provisional application No. 61/608,555, filed on Mar. 8, 2012.

(51) Int. Cl.
| | |
|---|---|
| *F21V 7/04* | (2006.01) |
| *F21V 13/02* | (2006.01) |
| *F21V 8/00* | (2006.01) |
| *F41G 1/35* | (2006.01) |
| *F41G 1/36* | (2006.01) |

(52) U.S. Cl.
CPC .............. *F21V 13/02* (2013.01); *G02B 6/0001* (2013.01); *F41G 1/35* (2013.01); *F41G 1/36* (2013.01)
USPC ........... 362/553; 362/110; 362/554; 362/555; 362/268; 42/114; 42/116

(58) Field of Classification Search
USPC ............ 362/110, 112, 553, 554, 268; 42/114, 42/116
See application file for complete search history.

(56) References Cited

U.S. PATENT DOCUMENTS

| | | | | |
|---|---|---|---|---|
| 4,519,020 | A | * | 5/1985 | Little ............................ 362/268 |
| 5,685,105 | A | | 11/1997 | Teetzel |
| 5,816,683 | A | | 10/1998 | Christiansen |
| 6,244,730 | B1 | * | 6/2001 | Goldberg et al. ............. 362/268 |
| 6,414,672 | B2 | * | 7/2002 | Rekimoto et al. ............ 345/173 |
| 6,866,401 | B2 | * | 3/2005 | Sommers et al. ............ 362/268 |
| 7,726,061 | B1 | | 6/2010 | Thummel |
| 2005/0254233 | A1 | | 11/2005 | Alessio |
| 2012/0287621 | A1 | * | 11/2012 | Lee et al. ...................... 362/231 |
| 2013/0182441 | A1 | | 7/2013 | Nemeyer |

OTHER PUBLICATIONS

U.S. Appl. No. 13/350,555 Office Action dated Jul. 5, 2013.
U.S. Appl. No. 13/350,555 Amendment dated Sep. 30, 2013.
U.S. Appl. No. 13/350,555 Amendment/RCE dated Jun. 9, 2014.
U.S. Appl. No. 13/350,555 Office Action dated Mar. 13, 2014.
Hecht, Optics (ISBN: 0805385665), 4th edition, pp. 171-175, 194-195.

* cited by examiner

*Primary Examiner* — Ali Alavi
(74) *Attorney, Agent, or Firm* — K&L Gates, LLP

(57) ABSTRACT

A light pointer (e.g., laser pointer) comprises an optical fiber light source. Optionally, the output beam provided by the pointer may be adjustable from small output angles (substantially collimated beam, "spot" mode to larger output angles providing "flood" illumination. The light pointer may emit infrared light, for example.

24 Claims, 6 Drawing Sheets

LIGHT POINTER HAVING OPTICAL FIBER LIGHT SOURCE

CROSS-REFERENCE TO RELATED APPLICATIONS

This application claims benefit of priority to U.S. Provisional Patent Application Ser. No. 61/608,555 titled "Light Point Having Optical Fiber Light Source" filed Mar. 8, 2012, which is incorporated herein by reference in its entirety.

FIELD OF THE INVENTION

The invention relates generally to light pointers such as laser pointers, for example.

BACKGROUND

Light pointers, e.g. laser pointers, may be used to point to objects at a distance. In addition, if the output beam of the pointer is adjustable from small output angles (substantially collimated beam, "spot" mode) to larger output angles providing "flood" illumination, the pointer may also be used in flood mode to provide illumination by which to inspect a wide area, and then adjusted to collimating mode to focus more tightly on anything of interest observed in the inspected area. Infrared pointers may be used for example, to illuminate, point to, or designate as a target an object viewed through suitable infrared viewing apparatus. Such infrared pointers may have various security, military, and hunting applications, for example.

SUMMARY

Systems, methods, and apparatus are disclosed by which light emitted by an optical fiber may be formed into an output beam for use as a light pointer. Optionally, the cone angle of the output beam may be adjustable from small angles (substantially collimated) to larger cone angles providing broader area "flood" illumination.

In one aspect, a light pointer comprises a light source optically coupled to an input end of an optical fiber, a collimating lens positioned along an optical axis of the light-pointer to collect light emitted from an output end of the optical fiber and provide from the collected light an output beam of light, and a housing in which the light source, the optical fiber, and the collimating lens are disposed.

Optionally, the position of the collimating lens is adjustable between a first position along the optical axis from which the collimating lens images the output end of the optical fiber to provide from the collected light a substantially collimated output beam of light and a second position along the optical axis from which the collimating lens provides from the collected light a diverging flood illumination beam of light. The substantially collimated output beam provided when the collimating lens is in the first position has, for example, a cone angle less than or equal to about 0.045 degrees, and the diverging flood illumination beam provided when the collimating lens is in the second position has, for example, a cone angle greater than or equal to about 3.0 degrees. The first position of the collimating lens may be farther from the output end of the optical fiber along the optical axis than is the second position of the collimating lens. The position of the collimating lens may be continuously adjustable between the first and second positions.

The light source may comprise, for example, one or more diode lasers. The one or more diode lasers may comprise, for example a near infrared diode laser, a short wavelength infrared diode laser, or both. Such a near infrared diode laser may be, for example, an 830 nm diode laser. Such a short wavelength infrared diode laser may be, for example, a 1470 nm diode laser. The light source may additionally or alternatively comprise visible wavelength diode lasers.

The optical fiber may comprise a coiled portion between its input and output ends. The collimating lens may be, for example, a near infrared achromatic doublet.

The position of the output end of the optical fiber, the position of the collimating lens, or the positions of both the output end of the optical fiber and the collimating lens may be adjustable in directions substantially perpendicular to the optical axis.

The light pointer may comprise a beam expanding optic positioned between the output end of the optical fiber and the collimating lens. The beam expanding optic may be or comprise, for example, a diverging lens. If such a beam expanding optic is present, its position may be adjustable in directions substantially perpendicular to the optical axis.

The light pointer may comprise another light source optically coupled into an input end of another optical fiber. In such variations, the position of the collimating lens, the positions of output ends of the optical fibers, or the position of the collimating lens and the positions of output ends of the optical fibers may be adjustable in directions substantially perpendicular to the optical axis to select between the collimating lens collecting light output from one optical fiber or the other.

The light pointers disclosed herein may comprise a mount configured to attach the housing to a weapon. In such variations, the position of the output end of the optical fiber, the position of the collimating lens, the position of any beam expanding optic located between the output end of the optical fiber and the collimating lens, or any combination of the preceding may be adjustable in directions substantially perpendicular to the optical axis to provide elevation and windage adjustments of the optical axis of the light pointer with respect to a firing axis of the weapon. The weapon may be, for example, a firearm.

In another aspect, a method of using any of the light pointers disclosed herein comprises illuminating a target of a weapon with an output beam from the light pointer. This method may comprise adjusting the divergence of the output beam to select between a collimated output beam and a more diverging flood illumination output beam. The weapon may be, for example, a firearm.

In another aspect, a method of using any of the light pointers disclosed herein comprises adjusting an orientation of the optical axis of the light pointer with respect to a firing axis of a weapon to which the light pointer is attached. The weapon may be, for example, a firearm.

These and other embodiments, features and advantages of the present invention will become more apparent to those skilled in the art when taken with reference to the following more detailed description of the invention in conjunction with the accompanying drawings that are first briefly described.

DETAILED DESCRIPTION

Figure 1A:
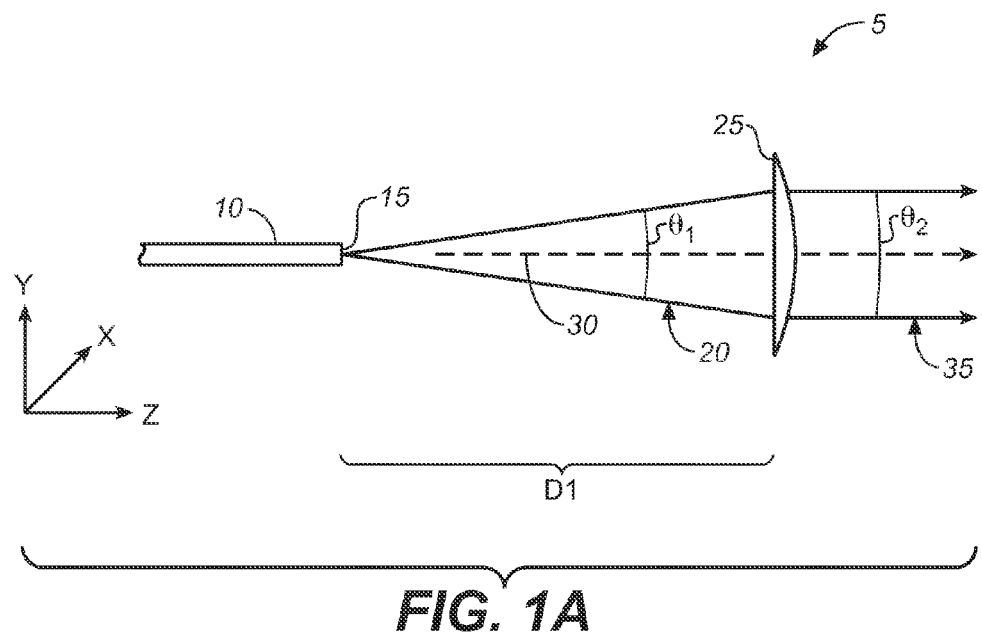
FIGS. 1A and 1B show an optical schematic of an example light pointer comprising an optical fiber light source and an adjustably positioned collimating lens located in its collimated beam ("spot" mode) position (FIG. 1A) and in a larger output cone angle ("flood" mode) position (FIG. 1B).

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

The terms "cone angle" and "divergence" as used herein refer to the angle between the outer edges of a beam of light in a plane containing the optical axis of the beam, with the "outer edges" of the beam located where the intensity of the beam falls to about 13.5% of the intensity in the central portion of the beam (e.g., for a Gaussian beam the "outer edge" of the beam corresponds to the "$1/e^2$" intensity contour). That is, the cone angle and the divergence are equal to twice the angle between an outer edge of the beam of light and the optical axis of the beam.

This specification discloses apparatus, systems, and methods by which light emitted by an optical fiber may be formed into an output beam for use as a light pointer. The light emitted by the optical fiber may be provided by any suitable light source optically coupled to an input end of the optical fiber. Regardless of the initial cross-sectional shape and transverse intensity profile of the light coupled into the optical fiber, the output beam emitted by the optical fiber typically has a circular cross-sectional shape with a smoothly varying transverse intensity profile. These beam characteristics may be preserved by subsequent optical elements in the light pointer. Consequently, light pointers disclosed herein may emit light beams that have substantially circular cross-sections with smoothly varying transverse intensity profiles.

The output beams are not required to have circular cross sections, however. In some variations the output beams may instead have other (non-circular) cross-sectional shapes, such as elliptical shapes for example.

The light pointers disclosed herein may be configured for mounting to a firearm or other weapon for use in aiming the weapon or in illuminating or otherwise designating a target. The light pointers may also be configured for vehicle mounting or for hand-held use for similar applications. The circular and smoothly varying light beam cross section that such light pointers may provide may be advantageous in such aiming, illuminating, and target designating applications. In variations in which the light pointer emits infrared light, the light pointer may be used in combination with infrared viewing apparatus for such applications.

In some variations the cone angle of the output beam of the light pointer may be adjustable from small angles (substantially collimated) to larger cone angles providing broader area "flood" illumination. The cone angle may be, for example, continuously adjustable between collimating mode and a range of flood mode cone angles, or adjustable in discrete increments between collimating mode and one or more flood mode cone angles.

Variations disclosed below may provide, for example, a 1 Watt near infrared or short wavelength infrared light pointer able to provide a collimated infrared light beam usable for aiming and target designating applications out to 40 kilometers or more, and a flood beam useful for illumination applications out to 7 kilometers or more.

In some variations, the output wavelength of the light pointer may be selectable between two or more wavelengths. For example, the output may be selectable between two or more different infrared wavelengths, between two or more different visible wavelengths, or between one or more visible wavelengths and one or more infrared wavelengths.

Figure 1B:
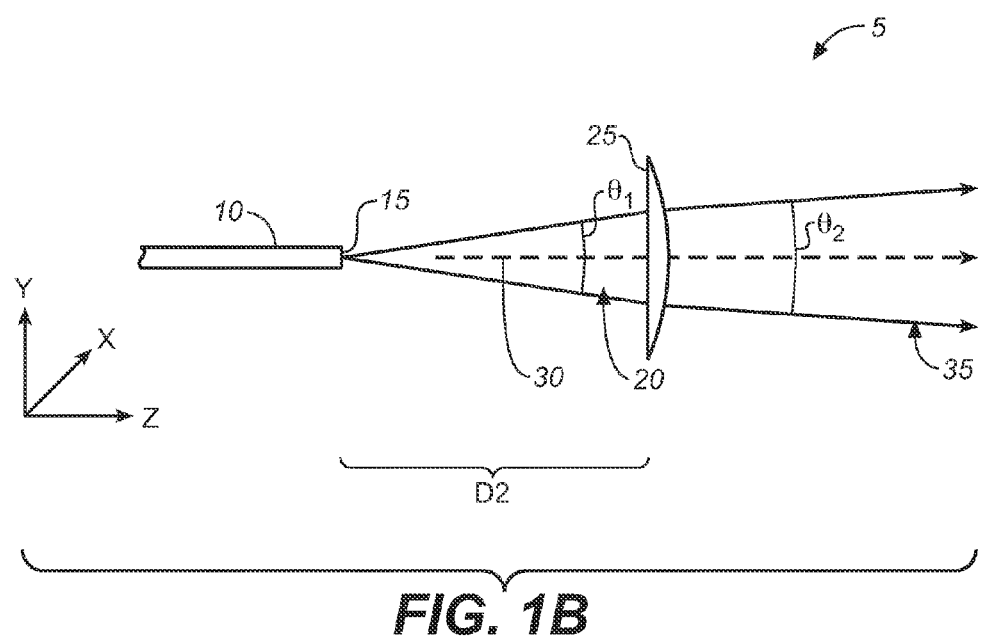

Referring now to FIGS. 1A and 1B, an example light pointer 5 comprises an optical fiber 10 having an output 15 from which a diverging light beam 20 having a substantially circular cross-section is emitted, and an adjustably positioned collimating lens 25 centered on optical axis 30 in light beam 20. Optical fiber output 15 may comprise, for example, a polished or cleaved face of the optical fiber oriented substantially perpendicular to the optical axis of the fiber. Optical fiber 10 comprises a central circularly shaped core portion surrounded by a lower refractive index cladding portion (see FIG. 4A, for example). Preferably, the light emitted by optical fiber 10 is primarily (e.g., ≥99%) emitted from the core portion of the fiber. One of ordinary skill in the art will recognize that the proportion of light in the optical fiber carried by the cladding can be conventionally controlled (e.g., limited) by, for example, suitably controlling the manner in which light is coupled into an input end of the optical fiber.

In collimating mode (FIG. 1A), collimating lens 25 is positioned to image the circular core of optical fiber 10 at output 15. That is, the back surface (surface closest to output 15) of collimating lens 25 is positioned at a distance D1 from output 15 such that the optical path length from the back surface of collimating lens 25 to output 15 of the optical fiber is approximately equal to the back-surface focal length of collimating lens 25. The collimated beam 35 provided by collimating lens 25 has a circular cross-section and a small cone angle $\theta_2$ less than cone angle $\theta_1$ of beam 20 emitted by optical fiber 10.

In optional flood mode (FIG. 1B), collimating lens 25 is moved along optical axis 30 from its collimating position to a position at a distance D2<D1 from optical fiber output 15 (i.e., closer to optical fiber output 15 than in collimation mode). As collimating lens 25 is moved from its collimating position toward optical fiber output 15, the cone angle $\theta_2$ of beam 35 provided by lens 25 increases correspondingly. Alternatively, in flood mode collimating lens 25 may be moved along optical axis 30 from its collimating position to a position at a distance D2>D1 (not shown). In such a position with D2>D1, collimating lens 25 will focus beam 35 to a waist, after which beam 35 will expand as a diverging (uncollimated) beam. The D2<D1 geometries require less space than the D2>D1 geometries, and are typically preferable for that reason. In either geometry, the resulting diverging output beam typically has a circular cross-section.

As further discussed below, some or all of the components of light pointer 5 may be housed in a housing that is mounted to, or mountable to, a firearm or other weapon or a vehicle. Alternatively, or additionally, the housing (and thus light pointer 5) may be configured to be hand-held. In the latter variations, the housing may be a flashlight-style housing, for example.

For convenient reference, FIGS. 1A and 1B and subsequent figures show a coordinate system having a Z-axis substantially parallel to optical axis 30 and X and Y axes substantially perpendicular to each other and to the Z axis. In some variations, the position of optical fiber 10, of collimating lens 25, or of optical fiber 10 and of collimating lens 25 may be adjusted along the positive and/or negative directions of the X and Y axes to adjust the direction in which beam 35 is emitted. When light pointer 5 is mounted to a firearm or other weapon, for example, such adjustments may correspond to adjusting the elevation (vertical adjustment) and windage (horizontal adjustment) of the light pointer to "sight-in" the weapon. That is, such adjustments allow the direction in which output beam 35 is emitted to be adjusted with respect to an axis along which the weapon fires. For example, the elevation adjustment may be used to account for the range to the target and the windage adjustment may be used to compensate for any cross-wind affecting the aiming of the weapon.

As noted above, and as further discussed below with respect to FIGS. 4A-4C and FIGS. 5A-5B, any suitable light source providing light at any suitable wavelengths may be coupled to an input end of optical fiber 10 to provide light for light pointer 5. Suitable wavelengths may include, for example, short wavelength infrared, near infrared, and visible wavelengths. The light source may be or comprise, for example, one or more fiber-coupled diode lasers each providing between about 0.1 and about 2.0 Watts of optical power at any suitable wavelengths between about 780 nanometers (nm) and about 2000 nm. For example, the light source may be or comprise a fiber coupled diode laser lasing in the near infrared to provide about 1 Watt of optical power at about 830 nm, or at about 850 nm, or at about 880 nm. Alternatively or in addition, the light source may be or comprise a fiber-coupled diode laser lasing in the short wavelength infrared to provide about 1 Watt of optical power at about 1470 nm, or at about 1500 nm, or at about 1550 nm. Suitable fiber-coupled diode lasers may be selected, for example, from among commercially available fiber-coupled diode lasers produced for the telecommunications industry. As one example, variations of the pointer disclosed herein may utilize a high-power 2 Watt 830 nm 2486-L4 Series fiber-coupled diode laser available from JDSU, Incorporated.

Optical fiber 10 may be any suitable optical fiber. Suitable optical fibers may be selected, for example, from among commercially available optical fibers produced for the telecommunications industry. A suitable optical fiber may have, for example, a low OH pure synthetic fused silica core of about 60 microns diameter surrounded by a fused silica cladding up to 250 microns in diameter. The cone angle (e.g., $\theta_1$ in FIG. 1A) of beam 20 emitted by optical fiber 10 is determined by the numerical aperture (NA) of the optical fiber, which is in turn determined by the diameter of the optical fiber core and the refractive indices of the core and cladding. Optical fiber 10 may have an NA of, for example, about 0.11 to about 0.22.

Figure 6:
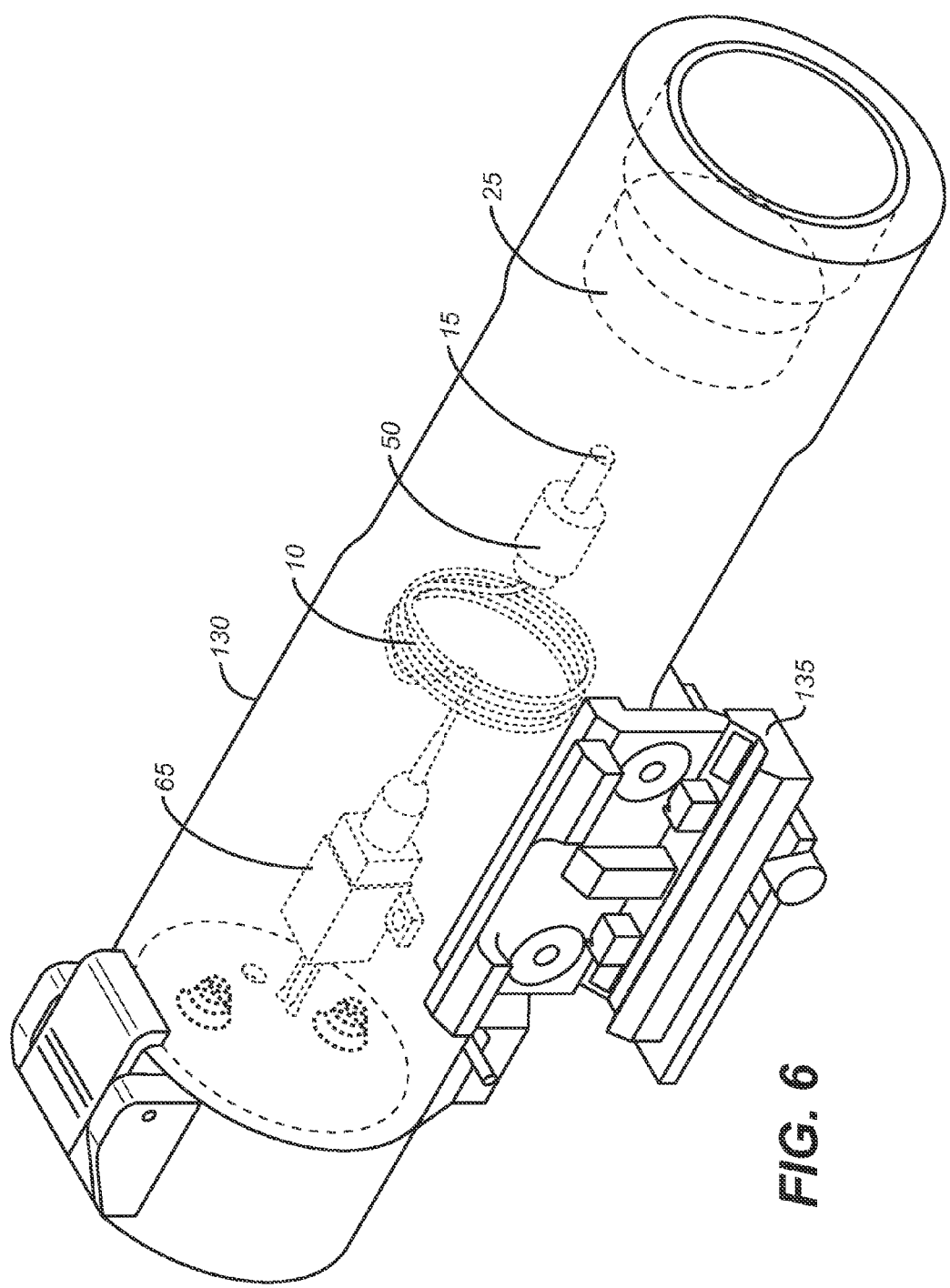
FIG. 6 shows a transparent view of a light pointer in a flash-light style weapon-mountable housing (for the purpose of the illustration, the housing is shown as transparent).

In this and all other variations of light pointer 5 disclosed herein, optical fiber 10 may optionally include a coiled portion of optical fiber of about 8 to about 12 turns and having a radius of curvature of about 1.0 centimeters (cm) to about 2.5 cm (see for example optical fiber 10 in FIG. 6 below). The coiled portion of optical fiber 10 induces transverse optical mode mixing within the fiber, which may further homogenize the light beam emitted by the optical fiber. Such coiling may also increase the divergence of the beam output by the optical fiber, and thus increase the beam spot size on collimating lens 25 and thereby reduce the divergence of the collimated beam provided by collimating lens 25.

Optical fiber 10 may be mounted in any suitable mount. In some variations, optical fiber 10 may be mounted in a conventional SMA 905 fiber connector. (See, for example, FIG. 6 below). In variations in which the X-Y position of output 15 of optical fiber 10 may be adjusted as described above, any suitable adjustment mechanisms may be used. Such adjustments may be made using conventional screw or other threaded mechanisms, for example.

Collimating lens 25 may have an effective focal length of, for example, about 60 mm to about 100 mm and a diameter, for example, of about 15 mm to about 40 mm. The f-number (ratio of focal length to clear diameter) of collimating lens 25 may be, for example, about 1 to about 2.5. The diameter of collimating lens 25 may be selected, for example, to be sufficiently greater than the diameter of beam 20 at lens 25 to accommodate transverse (X-Y) movement of beam 20 across lens 25 that may accompany X-Y adjustments of the direction of collimated beam 35 as described above. Collimating lens 25 may be a near infrared achromatic doublet, for example. Collimating lens 25 may comprise a broadband antireflective coating providing ≤about 1% reflectivity between about 750 nm and about 1550 nm.

In collimating mode (FIG. 1A), cone angle $\theta_2$ of collimated beam 35 may be, for example, less than or equal to about 0.5 milliradians (mrads), less than or equal to about 0.8 mrads, or between about 0.5 mrads and about 0.8 mrads.

In flood mode variations, in which the position of collimating lens 25 is adjustable along the optical axis between collimating and flood mode positions, lens 25 may be mounted, for example, on any suitable translation stage or other translation mechanism allowing the position of lens 25 to be varied along the optical axis continuously or in discrete increments. From its collimating position, lens 25 may be moved toward optical fiber output 15 by, for example, about 5 millimeters (mm) to about 25 mm to increase the cone angle of output beam 35 to greater than about 0.8 mrads, or greater than or equal to about 52 mrads, or to about 0.8 mrads to about 52 mrads. In variations in which the X-Y position of collimating lens 25 may be adjusted as described above, any suitable adjustment mechanisms may be used. Such adjustments may be made using conventional screw or other threaded mechanisms, for example.

Output beam 35 may have an optical power of, for example, about 1 Watt to about 2 Watts.

In one example, the output from a 1 Watt 830 nm diode laser is coupled into the approximately 60 micron diameter core of a coiled optical fiber 10 having a 0.22 NA, with the cladding carrying ≤1% of the optical power in the fiber. A near infrared achromatic doublet collimating lens 25 having an effective focal length of about 60 millimeters and a diameter of about 25 millimeters images the core of the fiber at output face 15 to provide a circular cross-section collimated output beam 35 having a cone angle $\theta_2$ of less than or equal to about 0.8 mrads. Collimating lens 25 may be translated along optical axis 30 toward optical fiber 10 a distance of about 15 mm to provide an output beam having a cone angle $\theta_2$ continuously variable between about 0.8 mrads and about 52 mrads. Output beam 35 has a power of about 1 Watt and a smoothly varying transverse intensity profile.

Figure 2A:
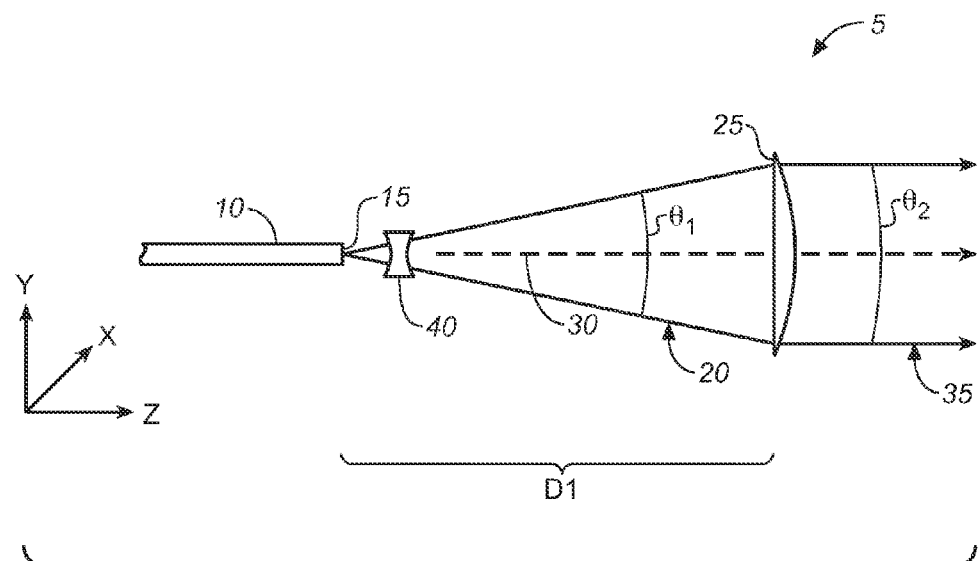
FIGS. 2A and 2B show an optical schematic of an example light pointer comprising an optical fiber light source, a beam expanding negative lens, and an adjustably positioned collimating lens located in its collimated beam ("spot" mode) position (FIG. 2A) and in a larger output cone angle ("flood" mode) position (FIG. 2B).
Figure 2B:
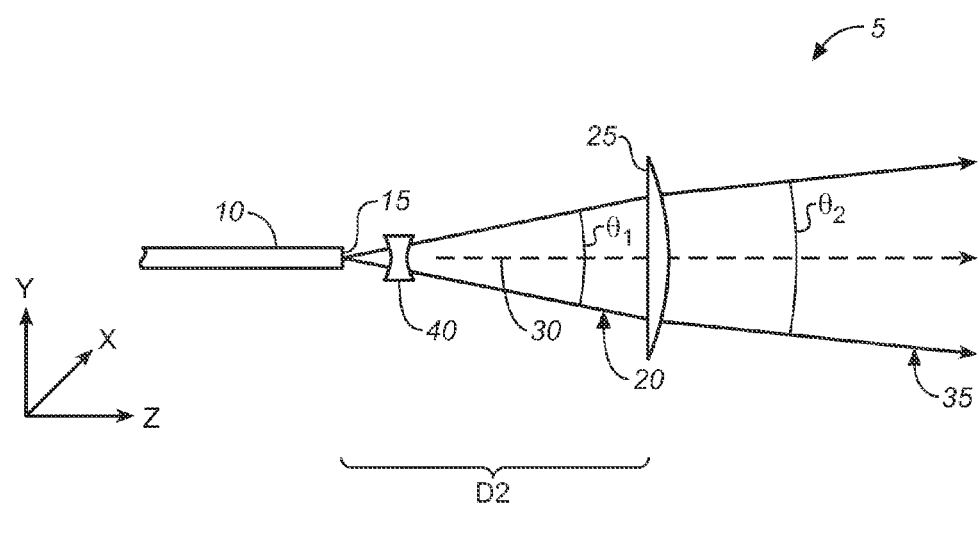
Figure 3A:
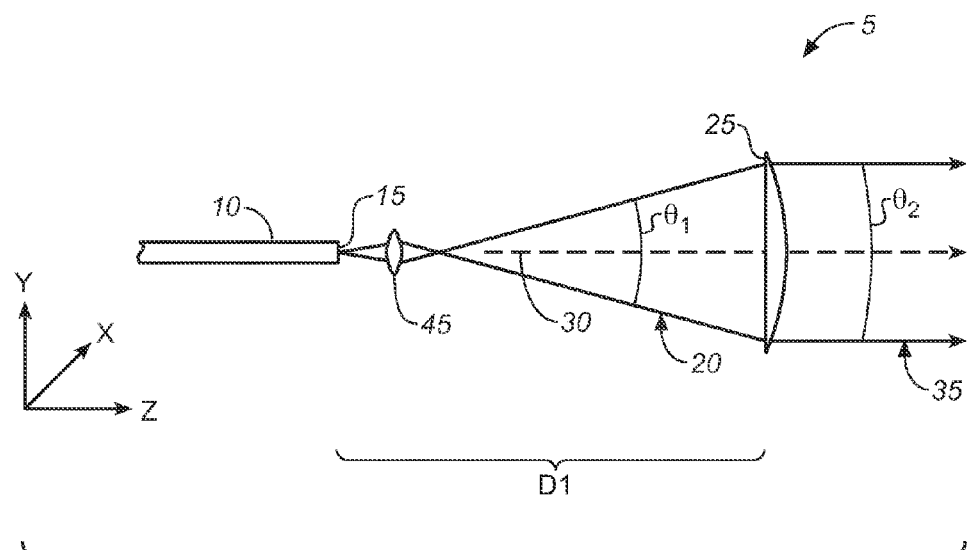
FIGS. 3A and 3B show an optical schematic of an example light pointer comprising an optical fiber light source, a beam expanding positive lens, and an adjustably positioned collimating lens located in its collimated beam ("spot" mode) position (FIG. 3A) and in a larger output cone angle ("flood" mode) position (FIG. 3B).
Figure 3B:
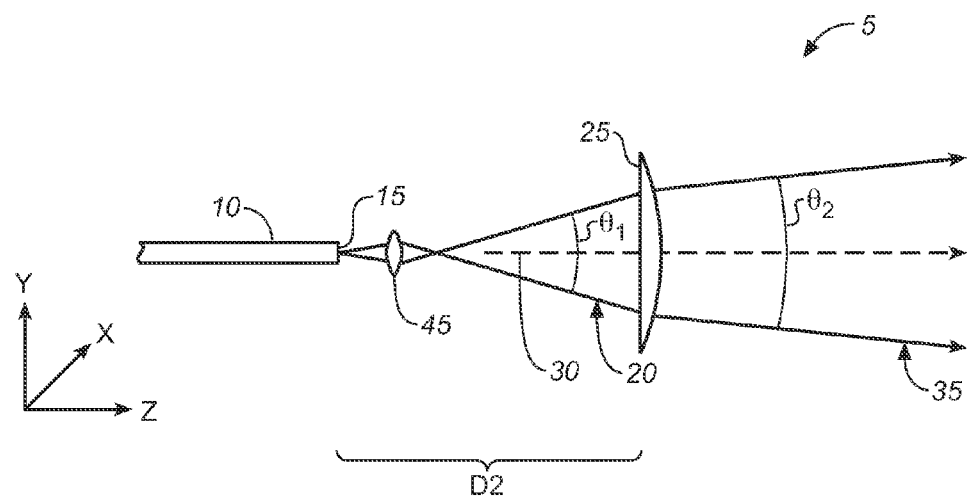

Referring now to FIGS. 2A-2B and to FIGS. 3A-3B, some variations of light pointer 5 include a beam expanding optic positioned between optical fiber output 15 and collimating lens 25. Any suitable beam expanding optic may be used. The variations illustrated in FIGS. 2A-2B employ a negative (diverging) lens 40 as a beam expanding optic. The variations illustrated in FIGS. 3A-3B employ a positive (focusing) lens 45 as a beam expanding optic. In either case, the beam expanding optic increases the cone angle $\theta_1$ of beam 20 incident on lens 25, and the diameter of beam 20 at lens 25, compared to the cone angle and diameter that beam 20 would have in the absence of the beam expanding optic. As a consequence of the increased divergence and diameter of beam 20, collimating lens 25 can provide a circular cross-section collimated output beam 35 having a cone angle smaller than would be possible with the same collimating lens (i.e., having the same focal length) in the absence of the beam expanding optic. In these variations, collimating lens 25 images the output face 15 of optical fiber 10 through the beam expanding optic.

In some of these variations, the position of the beam expanding optic may be adjusted along the positive and/or negative directions of the X and Y axes to adjust the direction in which beam 35 is emitted. Such adjustment to the position of the beam expanding optic may be instead of or in addition to adjustments to the X-Y positions of optical fiber 10 and collimating lens 25 described above. Any suitable mount and/or X-Y position adjustment mechanism may be used for the beam expanding optic. The X-Y position adjustments may be made using a screw mechanism, for example. Typically, the direction in which beam 35 is emitted is less sensitive to changes in the X-Y position of the beam expanding optic than to changes in the X-Y position of output 15 of optical fiber 10. This reduced sensitivity may make it easier to make fine adjustments to the direction of beam 35 by adjusting the beam expanding optic than by adjusting the position of optical fiber 10.

The variations illustrated by FIGS. 2A-2B and FIGS. 3A-3B differ from those illustrated by FIGS. 1A-1B primarily by the inclusion of the beam expanding optic, by the resulting changes to the range of cone angles achievable for output beam 35 for a given collimating lens, and, optionally, by changes in the focal length, diameter, and position of collimating lens 25. Otherwise, suitable optical fibers, light sources, wavelength ranges, output powers, and component mounts may be the same as or similar to those for the variations described above with respect to FIGS. 1A-1B.

Referring again to FIGS. 2A-2B, negative lens 40 may have an effective focal length of, for example, about −3 mm to about −6 mm and a diameter, for example, of about 2.5 mm to about 6.0 mm. Negative lens 40 may be positioned, for example, about 1 mm to about 4 mm from output 15 of optical fiber 10.

Collimating lens 25 may have an effective focal length of, for example, about 40 mm to about 100 mm and a diameter, for example, of about 20 mm to about 40 mm. The f-number of collimating lens 25 may be, for example, about 1 to about 2.5. As with the variations of FIGS. 1A-1C, the diameter of collimating lens 25 may be selected to be sufficiently greater than the diameter of beam 20 at lens 25 to accommodate transverse (X-Y) movement of beam 20 across lens 25 that may accompany X-Y adjustments of the direction of collimated beam 35 as described above. Collimating lens 25 may be a near infrared achromatic doublet, for example. Collimating lens 25 may comprise a broadband antireflective coating providing ≤about 1% reflectivity between about 750 nanometers and about 1550 nanometers.

In collimating mode (FIG. 2A), cone angle $\theta_2$ of collimated beam 35 may be, for example, less than or equal to about 0.25 mrads, less than or equal to about 0.5 mrads, less than or equal to about 0.8 mrads, about 0.25 mrads to about 0.8 mrads, or about 0.25 mrads to about 0.5 mrad. In optional flood mode (FIG. 2B), lens 25 may be moved from its collimating position toward negative lens 40 by, for example, about 5 mm to about 10 mm to increase the cone angle of output beam 35 to greater than or equal to about 52 mrads, greater than or equal to about 100 mrads, or to about 52 mrads to about 100 mrads.

In one example, the output from a 1 Watt 830 nm diode laser is coupled into the approximately 60 micron diameter core of an optical fiber 10 having a 0.22 NA, with the cladding carrying ≤1% of the optical power in the fiber. A negative lens 40 having a focal length of about −3 mm and a diameter of about 6.0 mm is positioned about 1.5 mm from output 15 of optical fiber 10 to expand the beam emitted by the optical fiber. An achromatic doublet collimating lens 25 having an effective focal length of about 60 millimeters and a diameter of about 25 millimeters images the core of the fiber at output face 15 through negative lens 40 to provide a circular cross-section collimated output beam 35 having a cone angle $\theta_2$ of less than or equal to about 0.5 mrads. Collimating lens 25 may be translated along optical axis 30 toward optical fiber 10 a distance of about 5 mm to provide an output beam having a cone angle $\theta_2$ continuously variable between about 0.5 mrads and about 52 mrads. Output beam 35 has a power of about 1 Watt and a smoothly varying transverse intensity profile.

In the variations illustrated by FIGS. 3A-3B, positive lens 45 focuses the beam emitted by optical fiber 10 to a waist between positive lens 45 and collimating lens 25. After the waist, the beam incident on collimating lens 25 has a divergence $\theta_1$ greater than that of the beam emitted by the optical fiber. In these variations, positive lens 45 may have an effective focal length of, for example, about 1.5 mm to about 3.0 mm and a diameter, for example, of about 2.5 mm to about 3.0 mm. Positive lens 45 may be positioned, for example, about 1 mm to about 1.5 mm from output 15 of optical fiber 10.

Collimating lens 25 may have an effective focal length of, for example, about 60 mm to about 100 mm and a diameter, for example, of about 20 mm to about 40 mm. The f-number of collimating lens 25 may be, for example, about 1 to about 2.5. As with the variations of FIGS. 1A-1C, the diameter of collimating lens 25 may be selected to be sufficiently greater than the diameter of beam 20 at lens 25 to accommodate transverse (X-Y) movement of beam 20 across lens 25 that may accompany X-Y adjustments of the direction of collimated beam 35 as described above. Collimating lens 25 may be a near infrared achromatic doublet, for example. Collimating lens 25 may comprise a broadband antireflective coating providing ≤about 1% reflectivity between about 750 nanometers and about 1550 nanometers.

In collimating mode (FIG. 3A), cone angle $\theta_2$ of collimated beam 35 may be, for example, less than or equal to about 0.25 mrads, less than or equal to about 0.5 mrads, less than or equal to about 0.8 mrads, about 0.25 mrads to about 0.8 mrads, or about 0.25 mrads to about 0.5 mrad. In optional flood mode (FIG. 3B), lens 25 may be moved from its collimating position toward negative lens 40 by, for example, about 5.0 mm to about 10.0 mm to increase the cone angle of output beam 35 to greater than or equal to about 52 mrads, greater than or equal to about 100 mrads, or to about 52 mrads to about 100 mrads.

Figure 4A:
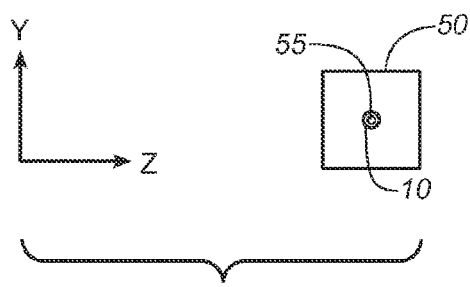
FIGS. 4A-4C show schematic diagrams of the output face of an optical fiber in an optical fiber mount (FIG. 4A), a light source comprising a laser controller, a fiber-coupled laser coupled into an output optical fiber, and an optical fiber mount for the output optical fiber (FIG. 4B), and a light source comprising a laser controller, dual fiber-coupled lasers coupled into the same output optical fiber, and an optical fiber mount for the output optical fiber (FIG. 4C).
Figure 4B:
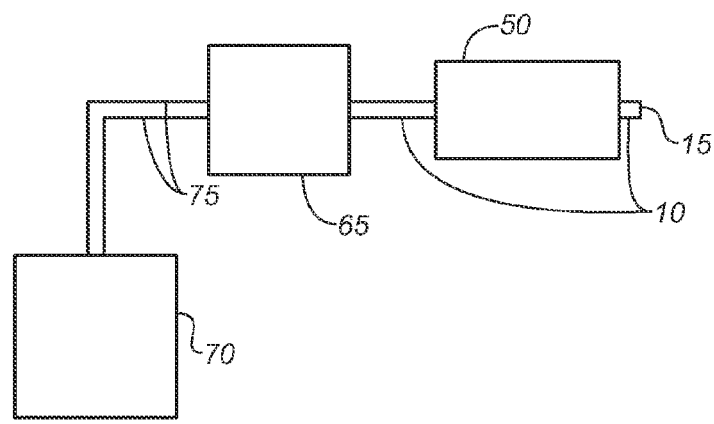

Returning again to a discussion of light sources for light pointer 5, FIG. 4A shows a schematic diagram of the output face of a single optical fiber 10 in an optical fiber mount 50, with a core portion 55 of optical fiber 10 surrounded by a cladding portion (unlabeled) as indicated. For convenient reference, FIG. 4A and FIG. 5A (discussed below) show X and Y coordinate axes corresponding to the XYZ coordinate system of the earlier figures. As schematically illustrated in FIG. 4B, the light source for light pointer 5 may further comprise a diode laser 65 coupled into the optical fiber 10, and a controller 70 that provides electric power to diode laser 65 through leads 75. Controller 70 may be operated by a user, for example, using any suitable switches (not shown) to turn diode laser 65 on or off or to vary its output power between, for example, high power and low power operation.

Figure 4C:
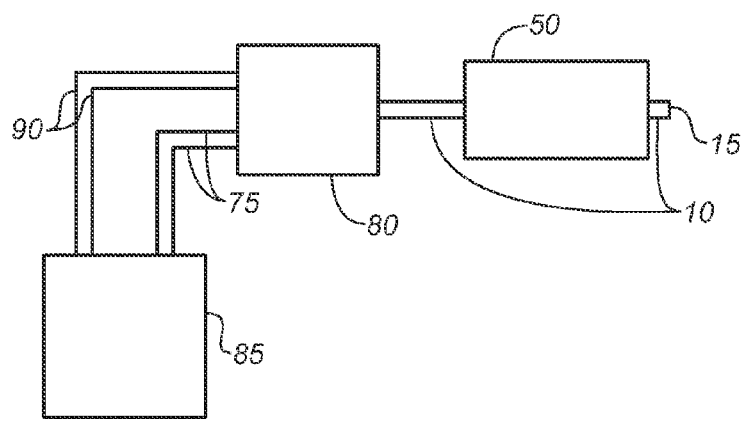

In the example of FIG. 4B, a single diode laser is coupled into optical fiber 10. However, in other variations any suitable number of diode lasers may be coupled into optical fiber 10. As schematically illustrated in FIG. 4C, for example, the light source for light pointer 5 may comprise a dual-laser package 80 including two diode lasers coupled to optical fiber 10. Suitable such dual laser packages are commercially available in the telecommunications industry. The two lasers in dual laser package 80 may comprise, for example, two near infrared lasers, two short wavelength infrared lasers, two visible lasers, a near infrared laser and a short wavelength infrared laser, a near infrared laser and a visible laser, or a short wavelength infrared and a visible laser.

Controller 85 provides power to the two lasers in dual laser package 80 through leads 75 (for one laser) and leads 90 (for the other laser). Controller 85 may be operated by a user, for example, using any suitable switches (not shown) to turn each of the two lasers on or off and to vary their output powers between, for example, high power and low power operation.

The light source configuration illustrated in FIG. 4C allows light pointer 5 to operate at two different wavelengths, with emission of light at either wavelength output from the same optical fiber 10. Light pointer 5 may also operate at two different wavelengths with the alternative light source configuration shown in FIGS. 5A and 5B. In this configuration, light pointer 5 comprises two optical fibers 10a and 10b, and may operate at a first wavelength with emission from one of the optical fibers, or at a second wavelength with emission from the other optical fiber.

Figure 5A:
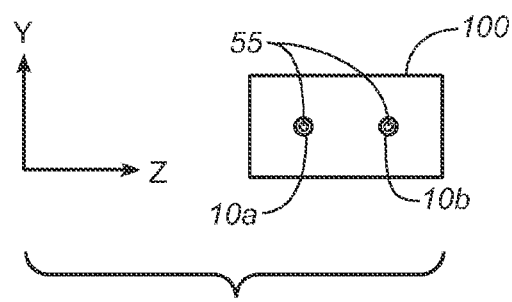
FIGS. 5A and 5B show schematic diagrams of the output faces of two optical fibers mounted in the same optical fiber mount (FIG. 5A), and a light source comprising a laser controller, two fiber-coupled lasers each coupled into a separate output optical fiber, and an optical fiber mount for the two output optical fibers (FIG. 5B).

FIG. 5A schematically illustrates the output faces of optical fibers 10a and 10b mounted in the same optical fiber mount 100. For a light pointer 5 comprising two optical fibers mounted in this manner, operation may be switched from one wavelength to another by translating mount 100 along the X and Y axes to place the output of one or the other of the optical fibers in position to be imaged by collimating lens 25. Alternatively, or in addition, lens 25 and/or any beam expanding optic present between lens 25 and the optical fibers may be translated along the X and Y axes so that the output of the desired optical fiber is imaged.

Figure 5B:
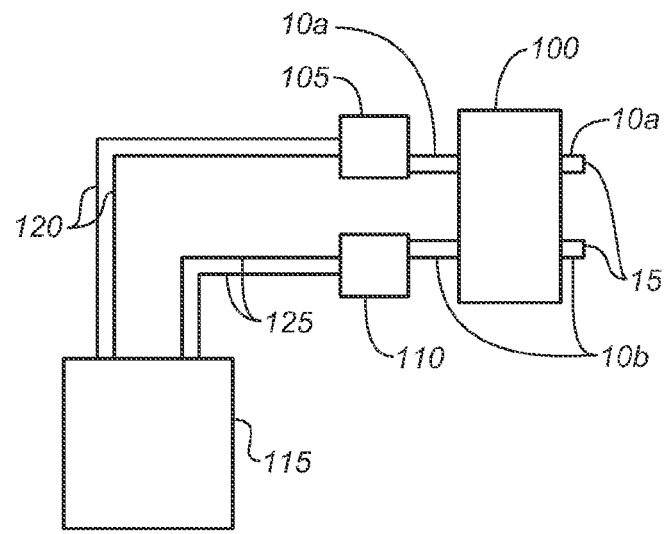

As schematically illustrated in FIG. 5B, in this variation the light source for light pointer 5 may further comprise a diode laser 105 coupled into optical fiber 10a, a diode laser 110 coupled into optical fiber 10b, and a controller 115 that provides electric power to diode laser 105 through leads 120 and to diode laser 110 through leads 125. Controller 115 may be operated by a user, for example, using any suitable switches (not shown) to turn each of the two lasers on or off and to vary their output powers between, for example, high power and low power operation. The pair of lasers 105 and 110 may comprise, for example, two near infrared lasers, two short wavelength infrared lasers, two visible lasers, a near infrared laser and a short wavelength infrared laser, a near infrared laser and a visible laser, or a short wavelength infrared and a visible laser.

Although FIGS. 5A and 5B show the use of only two optical fibers, each of which is coupled to a different laser, this scheme may be expanded to include more than two optical fibers each of which is coupled to a different laser. Further, the configurations of FIGS. 4C and 5B may be combined to provide a light source for light pointer 5 comprising two or more optical fibers, with some or all of the optical fibers coupled to two or more diode lasers.

Controllers 75, 85, and 115 referred to above may be any controllers suitable for controlling the operation of one or more diode lasers. Electric power for the light source may be supplied from batteries, for example, or in any other suitable manner.

The components of light pointer 5, including the light source components, lenses, and optical mounts may be housed in a housing that is mounted to, or mountable to, a firearm or other weapon or a vehicle. Alternatively, or additionally, the housing (and thus light pointer 5) may be configured to be hand-held.

Referring now to FIGS. 6A-6C, an example housing 130 comprises a mount 135 for mounting the housing to a firearm, to another type of weapon, or to a vehicle. In this illustration housing 130 is shown as being transparent to reveal components of light pointer 5, but typically housing 130 is opaque. Mount 135 may be, for example, compatible with MIL-STD-1913 Picatinny rails conventionally used for mounting accessories to firearms (e.g., as shown). Components of a light pointer 5 shown disposed within housing 130 include diode laser 65, coiled optical fiber 10, optical fiber mount 50, and collimating lens 25. As depicted, optical fiber mount 10 includes an SMA 905 type optical fiber connector. As described above, the distance between collimating lens 25 and optical fiber output 15 may be adjustably positioned to provide collimated or diverging output beams, and the position of optical fiber mount 10 may be adjustable in directions perpendicular to the direction of the output beam to adjust elevation and windage (adjusting mechanisms not shown). Housing 130 may also house a controller for diode laser 65 and a battery or other power supply for the light pointer. Housing 130 may have an internal diameter of, for example, less than about 1.5 inches.

This disclosure is illustrative and not limiting. Further modifications will be apparent to one skilled in the art in light of this disclosure and are intended to fall within the scope of the appended claims.

What is claimed is:

1. A light pointer comprising:
a light source optically coupled to an input end of an optical fiber;

a collimating lens positioned along an optical axis of the light pointer to collect light emitted from an output end of the optical fiber and provide from the collected light an output beam of light; and a housing in which the light source, the optical fiber, and the collimating lens are disposed, the housing configured for attachment to a firearm.

2. The light pointer of claim 1, wherein the position of the collimating lens is adjustable between a first position along the optical axis from which the collimating lens images the output end of the optical fiber to provide from the collected light a substantially collimated output beam of light and a second position along the optical axis from which the collimating lens provides from the collected light a diverging flood illumination beam of light.

3. The light pointer of claim 2, wherein the substantially collimated output beam provided when the collimating lens is in the first position has a cone angle less than or equal to about 0.045 degrees, and the diverging flood illumination beam provided when the collimating lens is in the second position has a cone angle greater than or equal to about 3.0 degrees.

4. The light pointer of claim 2, wherein the first position of the collimating lens is farther from the output end of the optical fiber along the optical axis than is the second position of the collimating lens.

5. The light pointer of claim 2, wherein the position of the collimating lens is continuously adjustable between the first and second positions.

6. The light pointer of claim 1, wherein the light source comprises one or more diode lasers.

7. The light pointer of claim 6, wherein the one or more diode lasers comprise a near infrared diode laser.

8. The light pointer of claim 7, wherein the near infrared diode laser is an 830 nm diode laser.

9. The light pointer of claim 6, wherein the one or more diode lasers comprise a short wavelength infrared diode laser.

10. The light pointer of claim 9, wherein the short wavelength infrared diode laser is a 1470 nm diode laser.

11. The light pointer of claim 1, wherein the optical fiber comprises a coiled portion between its input and output ends.

12. The light pointer of claim 1, wherein the collimating lens is a near infrared achromatic doublet.

13. The light pointer of claim 1, wherein the position of the collimating lens is adjustable in directions substantially perpendicular to the optical axis to provide elevation and windage adjustments of the optical axis of the light pointer with respect to a firing axis of the firearm.

14. The light pointer of claim 1, comprising another light source optically coupled into an input end of another optical fiber, wherein the position of the collimating lens, the positions of output ends of the optical fibers, or the position of the collimating lens and the positions of output ends of the optical fibers are adjustable in directions substantially perpendicular to the optical axis to select between the collimating lens collecting light output from one or the other of the optical fibers.

15. The light pointer of claim 1, wherein
the position of the collimating lens is adjustable between a first position along the optical axis from which the collimating lens images the output end of the optical fiber to provide from the collected light a substantially collimated output beam of light and a second position along the optical axis from which the collimating lens provides from the collected light a diverging flood illumination beam of light, the first position farther from the output end of the optical fiber along the optical axis than is the second position;

the substantially collimated output beam provided when the collimating lens is in the first position has a cone angle less than or equal to about 0.045 degrees, and the diverging flood illumination beam provided when the collimating lens is in the second position has a cone angle greater than or equal to about 3.0 degrees; and the light source comprises one or more diode lasers.

16. The light pointer of claim 15, wherein the one or more diode lasers comprise a near infrared diode laser.

17. The light pointer of claim 16, wherein the near infrared diode laser is an 830 nm diode laser.

18. The light pointer of claim 15, wherein the one or more diode lasers comprise a short wavelength infrared diode laser.

19. The light pointer of claim 18, wherein the short wavelength infrared diode laser is a 1470 nm diode laser.

20. The light pointer of claim 15, wherein the optical fiber comprises a coiled portion between its input and output ends.

21. The light pointer of claim 15, wherein the one or more diode lasers comprise a near infrared diode laser and a short wavelength infrared diode laser.

22. The light pointer of claim 21, wherein the near infrared diode laser is an 830 nm diode laser and the short wavelength infrared diode laser is a 1470 nm diode laser.

23. The light pointer of claim 21, comprising a beam expanding optic positioned between the output end of the optical fiber and the collimating lens.

24. The light pointer of claim 23, wherein the beam expanding optic is or comprises a diverging lens.

* * * * *